E. J. CONLEY.
SEALED METAL RECEPTACLE.
APPLICATION FILED MAR. 10, 1922.
1,432,968.  Patented Oct. 24, 1922.
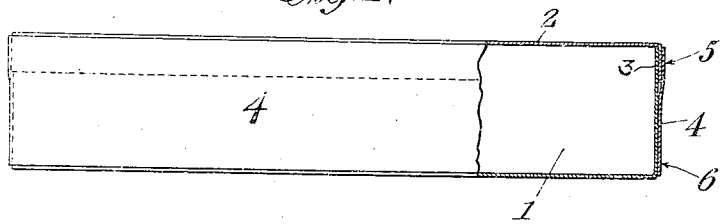
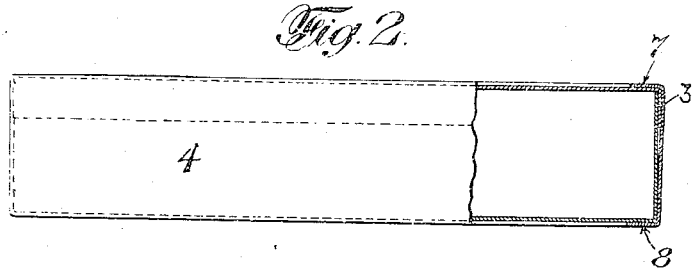
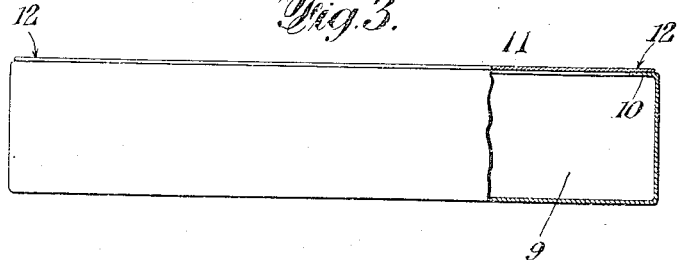
Inventor
Edwin J. Conley
By his Attorneys
Prindle, Wright & Small.

Patented Oct. 24, 1922.

1,432,968

UNITED STATES PATENT OFFICE.

EDWIN J. CONLEY, OF NEW YORK, N. Y.

SEALED METAL RECEPTACLE.

Application filed March 10, 1922. Serial No. 542,603.

*To all whom it may concern:*

Be it known that I, EDWIN J. CONLEY, a citizen of the United States, a resident of New York, in the county of New York and State of New York, have invented a certain new and useful Sealed Metal Receptacle, of which the following is a specification.

This invention has as an object the provision of a metal receptacle sealed with metal foil, particularly relatively thin foil having a thickness of less than 3/1000 of an inch. A further object is to provide such a receptacle with the foil fused thereto in a manner similar to that described in my Patent 1,398,840, granted November 29, 1921. A further object is to attach the foil to the receptacle in such a manner that it will not be ruptured easily. A still further object of the invention is to economize in the use of the metal foil and to cover only a portion of the receptacle where such covering is needed to secure a sealing. Further objects will appear from the following description.

The invention may assume various embodiments, and the following description is intended to represent several preferred embodiments of the invention. These preferred embodiments are illustrated in the accompanying drawings which form part of the specification, and in said drawings, Fig. 1 represents a metal receptacle sealed with a sheet of foil fused along the edge of the cover and the side of the receptacle;

Fig. 2 shows a similar metal receptacle with the sheet of foil fused to the top of the cover and the bottom of the receptacle; and Fig. 3 shows a metal receptacle with a sheet of foil fused to inturned portions thereof.

By way of a more detailed description, there is shown in Fig. 1 a metal receptacle 1 having a cover 2 with depending flange 3. A sheet of metal foil 4 is sealed along the portion 3 of the cover as indicated by numeral 5, and is also sealed to the receptacle 1 along the strip of surface indicated by numeral 6. The foil is not sealed to the receptacle 1 at intermediate portions, as this would cause the foil to rupture when handled, or even when attempting to fuse it to the receptacle. Due to the overlap of the portions 3 on the receptacle 1, there will be a space which the foil 4 must bridge, and it should therefore be sealed to the receptacle at a point sufficiently remote from these overlapping portions as not to occasion any rupturing when the receptacle is handled later on.

In Fig. 2 a similar receptacle and cover is shown, but in this case the sheet of foil is fused to the top of the cover along a strip of surface denoted by numeral 7, and is sealed to the receptacle along the strip of surface denoted by the numeral 8. No sealing is necessary between these portions, but the foil may also be sealed along the side of the cover and receptacle as in Fig. 1.

In Fig. 3 a receptacle 9 is shown having inturned flanges 10 to which is fused a sheet of foil 11 along surfaces indicated by the numeral 12, that is, on the top of these inturned flanges 10. A cover may subsequently be put on the receptacle if desired.

The receptacles may be made of tin or tinned iron, and the foil used for sealing them may be ordinary tin foil, but it is preferable to use foil having a thickness of less than 3/1000 of an inch, more specifically 1/1000 of an inch, as there will be a great economy when such thin foil is used. The entire receptacle need not be covered by the foil, as it is only necessary to use a sufficiently large sheet to hermetically seal the portions through which air may enter. A single sheet may be used to cover all such portions, or separate sheets of foil may be used on each side of the receptacle.

When using foil of a thickness less than 3/1000 of an inch the fusing of the foil is performed without any flux or solder, for such thin foil may be fused to the receptacle by proper sealing instruments without damaging the foil.

As many apparently widely different embodiments of this invention may be made without departing from the spirit thereof, it is to be understood that I do not intend to limit myself to the specific embodiment thereof, except as indicated in the appended claims.

By the term "metallically united" occurring in the claims is meant united by metallic connection, such as would be formed by fusion or soldering.

I claim:

1. A metal receptacle hermetically sealed with tin foil metallically united thereto.

2. A metal receptacle hermetically sealed with a sheet of metal foil fused to portions of the receptacle adjacent an opening.

3. A metal receptacle hermetically sealed with metal foil having a thickness of less than 3/1000 of an inch.

4. A metal receptacle sealed with a sheet of metal foil having a thickness of less than 3/1000 of an inch and attached to the receptacle by fusion.

5. A tin receptacle hermetically sealed with a sheet of tin foil having a thickness of less than 3/1000 of an inch by a metallic union.

6. A tin receptacle hermetically sealed by having fused thereto a sheet of tin foil having a thickness of less than 3/1000 of an inch.

7. A metal receptacle and cover therefor hermetically sealed with metal foil having a thickness of less than 3/1000 of an inch metallically united thereto.

8. A metal receptacle and cover therefor hermetically sealed with sheets of metal foil of a thickness less than 3/1000 of an inch, said sheets being fused to the receptacle and cover.

9. A metal receptacle sealed with metal foil fused thereto without any flux or solder, the foil having a thickness less than 3/1000 of an inch.

10. The method of uniting foil with a metal receptacle which comprises pressing the material of the receptacle and foil together and applying a fusing heat thereto.

In testimony that I claim the foregoing, I have hereunto set my hand this 9th day of March, 1922.

EDWIN J. CONLEY.